United States Patent [19]
Mott et al.

[11] Patent Number: 5,779,582
[45] Date of Patent: Jul. 14, 1998

[54] CHAIN GUIDE WITH TAPERED SIDE RAILS

[76] Inventors: Philip J. Mott, 1 Kimberly Cir.; Mark E. Patton, 7 W. Lake Rd., both of Dryden, N.Y. 13053; Timothy J. Ledvina, 30 Torok Rd., Groton, N.Y. 13073

[21] Appl. No.: 611,951

[22] Filed: Mar. 6, 1996

[51] Int. Cl.$^6$ .................. F16H 7/18; F16H 7/00
[52] U.S. Cl. ........................ 474/140; 474/148
[58] Field of Search ................ 474/111, 131, 474/140, 150, 273, 148

[56] References Cited

U.S. PATENT DOCUMENTS

| | | | |
|---|---|---|---|
| 2,737,823 | 3/1956 | Smallegan | 474/140 |
| 4,662,862 | 5/1987 | Matson | 474/101 |
| 4,832,664 | 5/1989 | Groger et al. | 474/111 |
| 5,045,032 | 9/1991 | Suzuki et al. | 474/140 |
| 5,318,482 | 6/1994 | Sato et al. | 474/111 |
| 5,676,614 | 10/1997 | Inoue et al. | 474/110 |

FOREIGN PATENT DOCUMENTS 5-321222  6/1995  Japan.

*Primary Examiner*—Tamara L. Graysay
*Assistant Examiner*—Gary S. Hartmann
*Attorney, Agent, or Firm*—Hugh Abrams, Esq.; Greg Dziegielewski, Esq.

[57] ABSTRACT

The chain guide of the present invention, which will be utilized on the tight side of the chain of an engine system, is designed to reduce the lateral motion of the chain. The chain guide is constructed with raised side rails that taper inward to the center. The slot which guides and controls the chain gradually narrows towards the center.

9 Claims, 3 Drawing Sheets

CHAIN GUIDE WITH TAPERED SIDE RAILS

BACKGROUND OF THE INVENTION

This invention relates to a chain guide for guiding drive chains and more particularly to a chain guide where the side rails are tapered inward towards the center of the chain guide. The chain guides of the preferred embodiment of the present invention are designed for use as chain guides in engine timing systems.

Conventional engine timing systems consist of a crankshaft and corresponding sprocket system which operate an engine with either a single or dual overhead camshafts. The operation of a conventional engine system is based upon a chain which extends from the crankshaft to the camshaft (or camshafts) and returns to the crankshaft in an endless loop. The movement of the crankshaft and the chain causes the camshaft to rotate.

One chain extends between the crankshaft and camshaft (or camshafts) of a first bank of cylinders and another chain extends between the crankshaft and camshaft (or camshafts) of a second bank of cylinders. Alternatively, a separate chain can drive between the two camshafts of each bank of cylinders in a dual overhead camshaft engine timing system. Examples of engine timing systems are shown in U.S. Pat. No. 5,427,580, entitled "Phased Chain Assemblies", which is incorporated herein by reference.

As the chain extends in an endless loop between the driving and the driven sprockets, such as those located on a crankshaft (driving) and camshaft (driven), the chain forms a "tight" side and a "slack" side. The "tight" side is formed by the tension in the span of chain between the links entering the driving sprocket and the links leaving the driven sprocket. A "slack" side is formed on the other span of chain between the links leaving the driving sprocket and entering the driven sprocket.

The performance and action of the chain differs dramatically between the tight and slack sides. A chain tensioner is conventionally used on the slack side of the chain. The tensioner acts to take up or eliminate the slack in the chain. As the engine accelerates or decelerates, the tensioner arm may move closer to the chain to maintain the tension, i.e., eliminate the slack in the chain. The tensioner arm typically includes a convex surface to match the path of the chain.

In contrast, a chain guide is conventionally used on the tight side of the chain. Such a guide does not include a tensioner piece, as the chain portion remains tight between the two sprockets. The guide serves to maintain the desired path of the chain between the sprockets.

In the use of the chain tensioner on the slack side of the chain, the tensioner arm is subject to vibrations and oscillations from the sudden acceleration and deceleration of the engine. Such vibration can cause wear on a tensioner arm surface.

In an effort to solve this problem associated with a chain tensioner arm on the slack side of the chain, Japanese published application no. 7-151197, teaches the use of a tensioner arm having a narrower width for an extremely small portion of the length of the tensioner arm. Since the tensioner arm has a convex shape, the narrow width portion, which has a width nearly the same as the width of the chain; restrains vibrations at the center that are encountered during acceleration and deceleration of the chain.

In contrast to the above-described Japanese published application, the present application is directed to a resonance problem that occurs on the tight side of a chain. Resonance of the chain causes a resonant chain vibration in a plane parallel to the crankshaft axis (lateral motion). This resonance is not a result of acceleration or deceleration, but is present on the tight side of the chain between the two sprockets.

The present invention is directed to a solution of the chain resonance or lateral motion of the chain on the tight side of the chain. Accordingly, the present invention is directed to a chain guide for the tight side of the chain, and not to a tensioner arm for the slack side of the chain as shown in the above-described published Japanese application.

The present invention provides for a chain guide with raised side rails which taper inward on both ends. The ends of the chain guide each taper inward for approximately one third of the length of the guide, so that the resulting middle portion, of uniform width, is approximately one third of the length of the guide rail. The preferred embodiment of the present invention utilizes the tapered side rails to help eliminate the lateral motion of the chain.

SUMMARY OF THE INVENTION

The present invention relates to a chain guide having raised side rails that taper inward to the center, which will be utilized on the tight side of the chain of an engine system to address the problem of lateral motion. Lateral motion is caused by the chain resonance that results from the movement of the chain. It has been shown that the lateral resonance is typically a result of a first order chain vibration. The result is nodal points should occur at either end, while the resonance is at an antinode in the middle of the chain. Accordingly, the ends of the chain span between the sprockets have limited lateral movement while the center of the chain would exhibit the most lateral motion. The present invention utilizes a chain guide in which the slot which guides and controls the chain gradually narrows towards the center. This restricts the chain at the antinode.

The present invention utilizes raised side rails that taper from a wide groove at the entrance of the guide to a narrowed section in the midspan of the guide. Thus, the guide would have a smaller width in the center portion and a gradual taper to a larger width towards the ends. The resulting double rail and inward taper reduces the resonance of the chain.

The greatest lateral motion occurs in the center of the span of chain. The preferred embodiment of the present invention is designed to control the chain in the center, at the point of greatest motion. By narrowing the center portion of the chain guide, the length of the vibrating chain is essentially reduced to the length from the center of the chain guide to the sprocket. As explained above, the guide is placed on the tight side of the chain.

In addition to preventing lateral motion of the chain, the chain guide of the present invention also prevents damaging energy buildup. When chain tension drops on either the slack or tight side of the chain, the chain effectively becomes longer. The extra chain length is taken up by motion in either the transverse direction, i.e., vibration in a plane perpendicular to the crankshaft axis, or the lateral direction, i.e., vibration in a plane parallel to the crankshaft axis. This movement of the chain increases the tension and thus the chain is controlled. On the slack side of the chain the tensioner system moves in the transverse direction to maintain the chain's tension. However, on the tight side of the chain the chain guide is fixed and cannot move to maintain the chain tension. The guide prevents motion in the transverse direction, therefore, the chain moves in the lateral direction. The chain guide of the present invention is designed to prevent this lateral motion.

As the chain moves away from the center line (lateral motion) the chain tension increases. The effect of this increasing tension is to pull the chain back towards the centerline at a high velocity. When this occurs at a lateral resonant frequency of the chain strand the system energy quickly increases to a point where the chain strikes the side rails enough to cause significant wear. If side rails are not present on the chain guide or if the side rails wear away, the chain can damage the surrounding engine parts. The chain guide of the present invention is designed to prevent this lateral motion and the damaging energy buildup.

Additional embodiments are shown with the guide having a groove with a tapered, curved and square cross-sectional shape. The guide can also have the narrowed portion on one or both side of the guide. In addition, the guide can be designed with tapered portions occurring at a plurality of locations along the chain guide to control higher order modes.

Other objects, features and advantages of the present invention will become apparent from the following detailed description when read in conjunction with the accompanying drawings.

DETAILED DESCRIPTION OF THE PRESENTLY PREFERRED EMBODIMENTS

Figure 1:
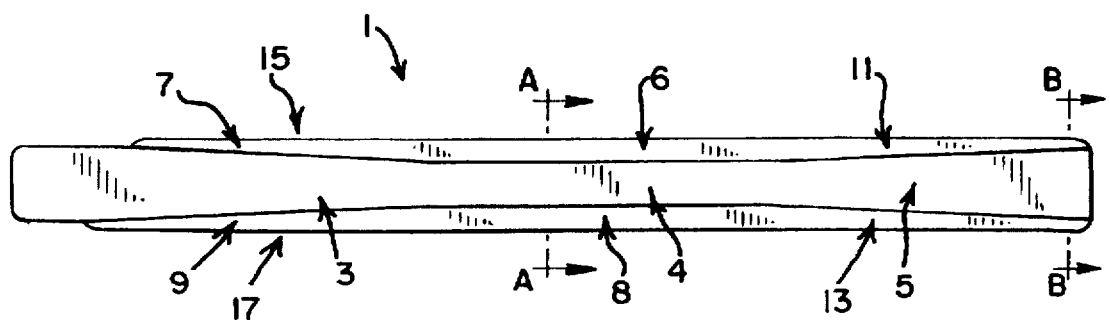
FIG. 1 is a top view of the chain guide of the present invention illustrating the tapered guide rails.

Turning now to the drawings, FIG. 1 depicts a preferred embodiment of the chain guide 1 of the present invention having raised side rails 15 and 17 which are tapered inward. The side rails 15 and 17 are tapered inward at both ends of the guide. The entrance taper 3 has both side rails 7 and 9 tapering inward toward the center 4. The entrance taper portion 3 of the chain guide 1 consists of approximately the first third of the length of the chain guide. The center portion 4 of the chain guide has both side rails 15 and 17 maintaining straight sides. The center portion 4 of the chain guide 1 maintains the same width between the side guide rails 15 and 17. The center portion 4 of the chain guide 1 consists of approximately the middle third of the length of the chain guide 1. The exit taper 5 portion of the chain guide 1 has both side rails 11 and 13 tapering outward until they reach the original width of the guide rail. The exit taper 5 portion of the chain guide 1 consists of approximately the last third of the length of the chain guide.

Figure 2:
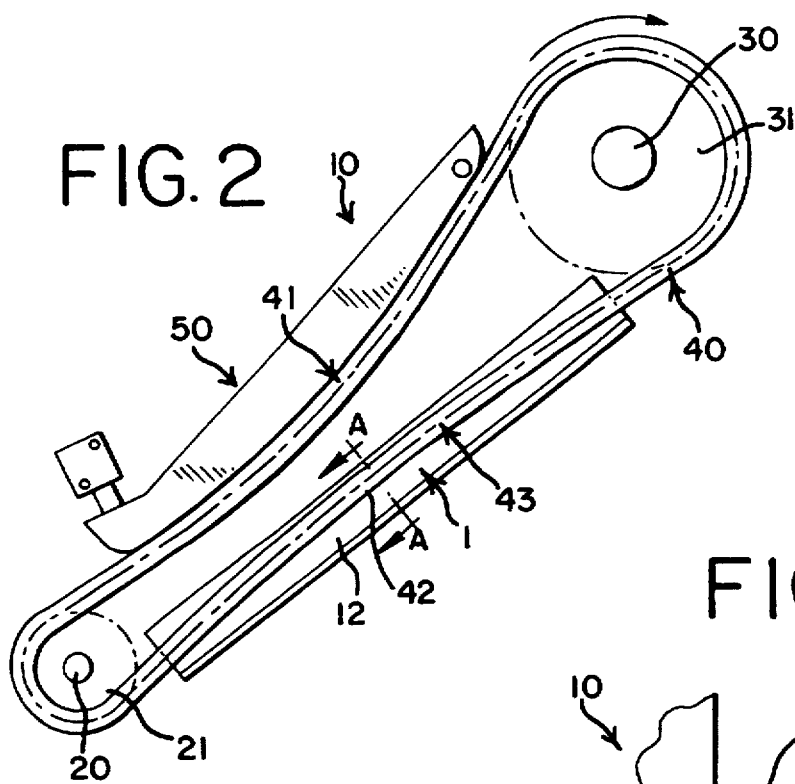
FIG. 2 is a side view of one embodiment of the power transmission chain and guide system of the present invention in an engine between the crankshaft and one camshaft.

FIG. 2 depicts one embodiment of the system of the present invention having a chain guide with tapered side rails. The illustration shows only a single engine bank of the engine timing system. The engine system consists of a crankshaft 20 and corresponding sprocket 21 and a sprocket 31 mounted on camshaft 30. As explained above, the guide of the present invention may be used with other engine timing systems.

The engine timing system 10 includes chain 40, chain tensioner system 50, and chain guide 1. The engine chain 40 extends from the crankshaft 20 to the camshaft 30 and returns to the crankshaft 20 in an endless loop. The movement of the crankshaft 20 causes the sprocket 21 to rotate which, in turn, causes sprocket 31 and camshaft 30 to rotate.

The crankshaft sprocket 21 is the driving sprocket and thus the tight side 43 of the chain is formed between the links entering the crankshaft sprocket and leaving the camshaft sprocket 31. The slack side 41 is the opposite side of the chain between the two sprockets 21, 31.

The slack side has a chain tensioner system 50. The tensioning system 50 is designed to maintain the tension on the slack side of the chain. The tight side 43 of the chain 40 has a chain guide 1 to keep the chain in position. The chain guide 1 is positioned so that its upper side 12 is against the underside 42 of the chain 40. The chain 40 is forced into motion by the sprockets 21 and 31, resulting in its movement across or through the groove of the chain guide 1.

Figure 3:
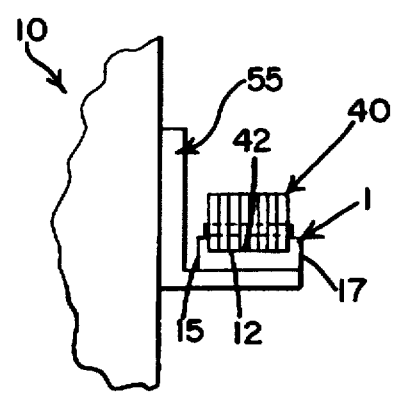
FIG. 3 is a cross sectional view of the guide of the present invention illustrating the position of the chain on the guide which has both raised and tapered side rails.
Figure 4:
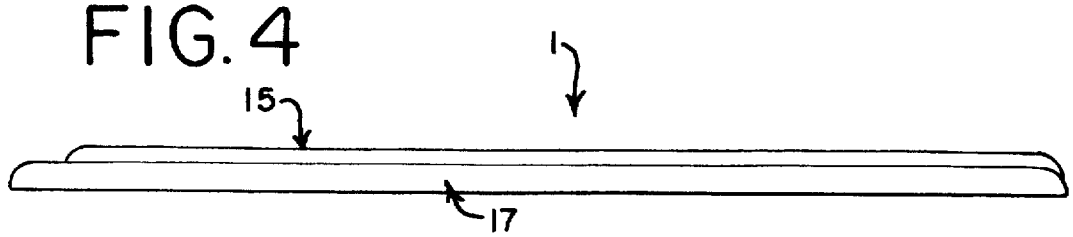
FIG. 4 is a perspective view of the chain guide of the present invention illustrating the raised side rails.
Figure 5:
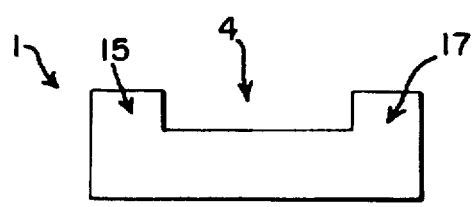
FIG. 5 is a cross sectional view of the chain guide of the present invention illustrating the width of the center portion of the chain guide along line A—A in FIG. 1.

FIG. 3 depicts a cross sectional view of the engine system of the present invention having a chain guide with raised and tapered side rails. The engine system 10 utilizes a mounting bracket 55 to position the chain guide 1 against the engine block and engine timing chain 40. The chain 40 is positioned so that its underside 42 runs across the upperside 12 of the chain guide 1. The chain guide's side rails 15 and 17 are raised to help the chain 40 maintain its desired position. The raised side rails 15 and 17 are illustrated more clearly in FIG. 4.

As previously explained, the strand of chain on the tight side experiences a resonance or lateral motion. This lateral motion is in the plane parallel to the crankshaft axis or lateral to the movement from entrance portion 3 to exit portion 5 shown in FIG. 1. The lateral motion occurs in a first order vibration with nodes generally in the entrance and exit portions 3, 5, and an antinode in the central portion of the guide 6.

Accordingly, the side rails are tapered inward in the central portion 6 to minimize lateral motion. In one preferred embodiment, the chain guide width at the central portion 6 is 0.46 inches and width at the entrance and exit portion is 0.54 inches. The length of entrance, central and exit portions is 4 inches, 4 inches, and 4 inches, respectively.

Figure 6:
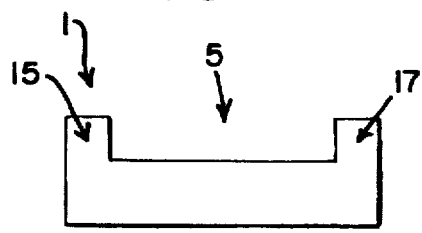
FIG. 6 is a cross sectional view of the chain guide of the present invention illustrating the width of the chain guide along line B—B in FIG. 1.
Figure 7:
FIG. 7 is a cross-sectional view of an alternate embodiment of the chain guide having a curved groove.
Figure 8:
FIG. 8 is a cross-sectional view of an alternate embodiment of the chain guide having a tapered groove.

While FIG. 6 illustrates the guide with a square groove or cross sectional shape, other shapes are possible. FIG. 7 illustrates a curved groove shape and FIG. 8 illustrates a tapered groove shape. These alternate cross sectional embodiments are also utilized to maintain the tension in the chain. When the chain is in motion and the lateral motion begins to occur, the curved and tapered grooves maintain the chain's tension by allowing the chain to ride up the side of the groove.

Figure 9:
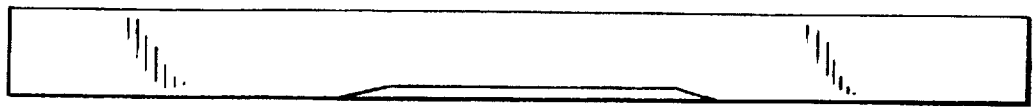
FIG. 9 is a top view of an alternate embodiment of the chain guide having a tapered rail on only one side of the guide and only at the center portion.
Figure 10:
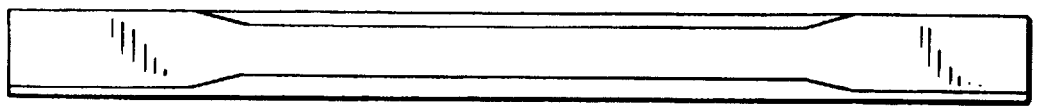
FIG. 10 is a top view of an alternate embodiment of the chain guide having tapered guide rails, wherein one side has a tapered guide rail which extends the entire length of the guide and the other side has a tapered rail only in the center portion of the guide.
Figure 11:
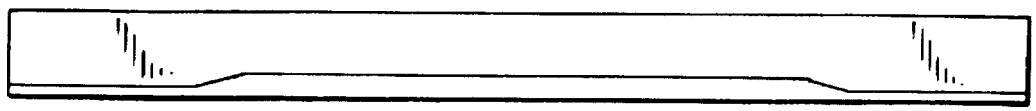
FIG. 11 is a top view of an alternate embodiment of the chain guide having a tapered rail which extends the entire length of the guide on only one side of the guide.

FIG. 1 illustrates the tapered or narrow width portion as being along both sides and through the center portion. Other variations are also possible. For example, FIG. 9 shows a narrow width portion on only one side and in the center portion. FIG. 11 shows the narrow width portion along only one side, but extending along the entire length of the rail. FIG. 10 shows one side with a narrow portion only in the center and the other side along the entire length. These alternate embodiments are designed to maintain tension in the chain at various modes (first, second, or higher modes). FIG. 9 depicts a guide designed to prevent first order chain vibration (first mode deflection). Alternately, FIG. 10 and FIG. 11 are designed with the tapered portion extending the entire length of the guide to control all vibrational modes.

Figure 12:
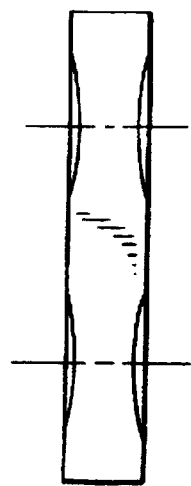
FIG. 12 is a top view of an alternate embodiment of the chain guide of the present invention illustrating tapered side rails designed to prevent the second order vibrational mode.
Figure 13:
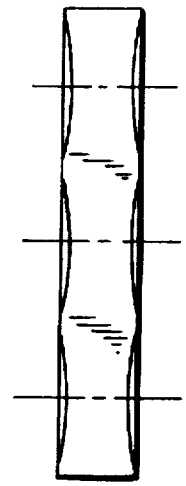
FIG. 13 is a top view of an alternate embodiment of the chain guide of the present invention illustrating tapered side rails designed to prevent the third order vibrational mode.

FIG. 12 and FIG. 13 illustrate alternate embodiments of the chain guide of the present invention designed to prevent a plurality of vibrational modes. FIG. 12 is designed to prevent the second order vibrational mode and FIG. 13 is designed to prevent the third order vibrational mode. In addition, the chain guide can be designed with more tapered segments to prevent even higher vibrational modes. To control the higher vibrational modes the chain guide is designed with the taper extending the full length of the guide, as illustrated in FIG. 1.

Those skilled in the art to which the invention pertains may make modifications and other embodiments employing the principles of this invention without departing from its spirit or essential characteristics, particularly upon the foregoing teachings. The described embodiments are to be considered in all respects only as illustrative and not restrictive, and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A power transmission chain and guide system for a high speed, automotive application, said chain and guide system comprising:
    a plurality of sprockets including at least one driving sprocket connected to a power input and at least one driven sprocket connected to a power output;
    a chain assembled of interleaved links, said chain wrapped around said plurality of sprockets, said chain including at least one tight strand portion having some of said links being pulled by said driving sprocket and at least one slack strand portion;
    a chain guide located along said tight strand portion of said chain, said guide having a substantially horizonal portion and raised side rails to create a groove for passage of said chain in a longitudinal direction from a guide inlet at one end through a center portion to a guide outlet at another end, said guide inlet being of a first width, said center portion being of a second width and said guide outlet being of a third width, each of said first, second and third widths being defined as the distance across the groove between said side rails in the lateral direction of the movement of the chain through said groove, said side rails being arranged for said second width to be of narrower width than said first width and said third width in the lateral direction of the movement of the chain at said center portion between said guide inlet and said guide outlet, said guide inlet and guide outlet have gradually narrowing portions from the ends of the rail inward towards the center portion, said guide inlet and guide outlet each comprise approximately one-third of the length of the chain guide in the longitudinal direction and where the center portion of the guide comprises approximately one-third of the length of the chain guide in the longitudinal direction.

2. The power transmission chain and guide system of claim 1 wherein said center portion of the chain guide has a uniform width in the lateral direction.

3. The power transmission chain and guide system of claim 1 wherein the side rails are raised a uniform height along the entire length of the chain guide.

4. A power transmission chain and guide system for use in a high speed automotive application, said chain and guide system comprising:
    a plurality of sprockets including at least one driving sprocket connected to a power input and at least one driven sprocket connected to a power output,
    a chain assembled of interleaved links, said chain wrapped around said plurality of sprockets, said chain including at least one tight strand portion between said sprockets, said tight strand portion having some of said links being pulled by said driving sprocket and at least one slack strand portion between said sprockets,
    a chain guide located along said tight strand portion of said chain, said guide having a substantially horizontal portion and raised side rails to create a groove for passage of said chain in a longitudinal direction from a guide inlet at one end through a center portion to a guide outlet at another end, said guide inlet being of a first width, said center portion being of a second width and said guide outlet being of a third width, each of said first, second and third widths being defined as the distance across said groove between said side rails in the lateral direction of the movement of the chain through said groove, said side rails being arranged for said second width to be of narrower width than said first width and said third width in the lateral direction of the movement of the chain at said center portion between said guide inlet and said guide outlet, each of said side rails further comprises a plurality of segments arranged to provide a portion of a narrower width in the lateral direction between said guide inlet and said guide outlet.

5. The power transmission chain and guide system of claim 4 wherein said side rails and said groove for passage of the chain have a curved shape in the lateral direction.

6. The power transmission chain and guide system of claim 4 wherein said side rails and said groove for the passage of the chain have an inclined shape towards the center in the lateral direction.

7. A power transmission chain and guide system for a high speed, automotive application, said chain and guide system comprising:
    a plurality of sprockets, including at least one driving sprocket connected to a power input and at least one driven sprocket connected to a power output;
    a chain assembled of interleaved links, said chain wrapped around said plurality of sprockets, said chain including at least one tight strand portion having some of said links being pulled by said driving sprocket and at least one slack strand portion;

a chain guide located along said tight strand portion of said chain, said guide having a substantially horizontal portion and raised side rails to create a groove for passage of said chain in a longitudinal direction from a guide inlet at one end through a center portion to a guide outlet at another end, said guide inlet being of a first width, said center portion being of a second width and said guide outlet being of a third width, each of said first, second and third widths being defined as the distance across the groove between said side rails in the lateral direction of the movement of the chain through said groove, said side rails being arranged for said second width to be of narrower width than said first width and said third width in the lateral direction of the movement of the chain at said center portion between said guide inlet and said guide outlet, wherein one side rail has a tapered segment in the longitudinal direction, said tapered segment being positioned in the center portion of the guide.

8. The power transmission chain and guide system of claim 7 wherein said one side rail has a tapered segment extending the entire length of the side rail and the other side rail has a tapered segment in the longitudinal direction positioned only in the center portion of the guide.

9. The power transmission chain and guide system of claim 7 wherein one side rail has said tapered segment in the longitudinal direction which extends the entire length of the guide rail.

* * * * *